Feb. 24, 1948.     E. LESHNER     2,436,391
CRUISE CONTROL COMPUTER
Filed March 22, 1946     2 Sheets-Sheet 1

INVENTOR
ERVIN LESHNER
BY
HIS ATTORNEYS

Feb. 24, 1948. E. LESHNER 2,436,391
CRUISE CONTROL COMPUTER
Filed March 22, 1946 2 Sheets-Sheet 2

INVENTOR
ERVIN LESHNER

By Clade Koontz and
Frederick W. Cottman
HIS ATTORNEYS

Patented Feb. 24, 1948

2,436,391

UNITED STATES PATENT OFFICE 2,436,391

CRUISE CONTROL COMPUTER

Ervin Leshner, Philadelphia, Pa.

Application March 22, 1946, Serial No. 656,238

4 Claims. (Cl. 235—78)

(Granted under the act of March 3, 1883, as amended April 30, 1928; 370 O. G. 757)

The invention described herein may be manufactured and used by or for the Government for governmental purposes without payment to me of any royalty thereon.

This invention relates to computers and particularly to a computer for progressively logging the decreasing gross weight and corresponding fuel remaining in the tanks of an aircraft at the conclusion of successive legs of its flight.

An object of the invention is to provide a computer of this type whereby, given the gross weight of the craft, the amount of fuel carried, the fuel consumption per unit of time and the duration of the period, the contemplated new gross weight and fuel remaining at the expirating of the period may be found and read directly by correlating the several elements of the computer.

Other objects, advantages, and meritorious features will be evident as the invention is described in detail and reference is had to the drawings, wherein:

Fig. 4 is a section taken at 4—4 of Fig. 1.

Like reference characters refer to like parts throughout the several views.

Figure 1:
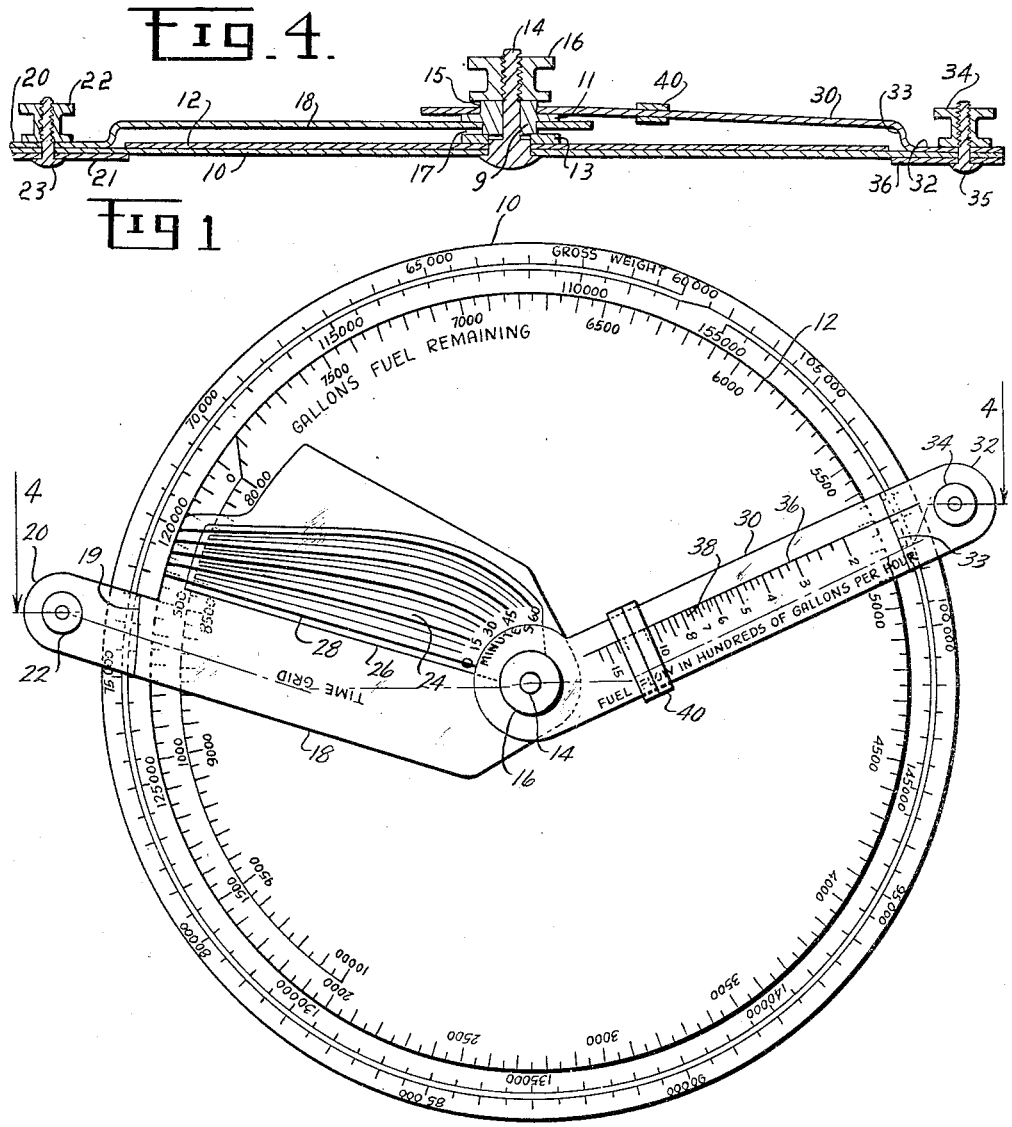
Fig. 1 shows the computer with the cursors spread apart for clearness in description.

The computer, herein shown by way of an exemplification of my invention, includes a lower disc 10 preferably of white opaque material with circumferentially equally spaced graduations around the outer edge which represent the gross weights of the range of aircraft to which my computer is applicable. In order to cover a wide range of gross weights, in the present case 60,000 lbs. to 155,000 lbs., the graduations overlap and thus may extend substantially twice around the disc. For convenience in description these graduations may be referred to as the "gross weight" scale, and should be so designated on the disc 10.

Concentrically superimposed on the lower disc 10, and pivotally supported thereon for rotation with respect thereto is a smaller upper disc 12 also of white opaque material with circumferential equally spaced graduations around the edge which represent the gallons of fuel on the aircraft at the time that a computation is about to be made. Inasmuch as a gallon of fuel weighs approximately six pounds, a unit on the "gals fuel" scale corresponds in angular measurement to six units on the "gross weight" scale. In order to suitably extend the range, in this case 0 to 10,000 gallons, this second graduation is overlapped about ninety degrees. A collar 9 having an integral flange 11, a washer 13, a clamp bolt 14 and a nut 16 are provided to clamp the upper and lower discs together as shown against relative rotation. For convenience in description the graduations around the outer edge of the second disc may be referred to as the "gals fuel" scale and should be so designated on the disc 12.

Hingedly supported at the center of the discs 10 and 12 on the collar 9 is a cursor 18 which is preferably made of a transparent material and, by reason of the space 15, is rotatable with respect to the discs even when the bolt 14 and nut 16 are locked. The cursor 18 extends beyond the outer edge of the discs and is offset at 19, so that, while for the greater part of its length it lies over the upper disc 12, it lies against the lower disc 10 from the point 19 outward. The outer end 20 of the cursor 18 extends beyond the outer edge of the discs and is provided with clamping means 21, 22 and 23 whereby the cursor 18 when rotated on the collar 9 to any selected position with respect to the discs may be locked in that position. A graduation 24 is laid out on an opaque portion 26 of the cursor 18, the zero line 28 of which is radial, and the lines which succeed the zero line are progressively more curved and represent the minutes duration of a leg of the flight being considered. The series of curved lines laid out on the cursor 18 together with the zero line 28 alongside the curved lines may conveniently be referred to as the "time grid" and should be so designated on the cursor 18. The curved lines on the "time grid" are so plotted that the hundreds of gallons per hour set up on the "fluid flow" scale times the fraction of an hour set up on the "time grid" will equal the gallons fuel on the "gals fuel" scale on the under disc between the zero line 28 of the first cursor 18 and the index line 36 of a second cursor 30. It is here noted, however, that while the time grid is composed of a series of curved lines, they may be replaced by a series of straight parallel lines if the "fuel flow" graduations are suitably modified.

Hingedly supported at the center of the discs 10 and 12 on the collar 9 and above the cursor 18 is the second transparent cursor 30 which is separately rotatable with respect to the cursor 18 and the discs 10 and 12 by reason of the space 17, even when the bolt 14 and nut 16 are locked. The outer end 32 of the cursor 30 extends beyond the outer edge of the discs and is offset at 33 so that, while it lies on top of the cursor 18 for the greater part of its length, it lies against the lower disc 10 from the point 33 outward. The cursor 30 at the extreme outer end 32 is provided with a clamping means 34, 35 and 36. The cursor 30 may be rotated to any selected position with respect to the cursor 18 and the discs 10 and 12 and locked in that position by the clamping means 34, 35 and 36. The clamping means 34, 35 and 36 as well as the clamping means 21, 22 and 23, and the clamp nut 16 may be omitted if suitable friction means is provided to hold the relative parts in the positions to which they are set. An index line 36 on the cursor 30 extends radially from the center outward, the length of the line being equal to the radius of the disc 10. The index line 36 is so placed on the cursor 30 that when the outer ends 20 and 32 of the cursors 18 and 30 are brought together, their contacting edges will constitute stop means whereby the zero line 28 of the cursor 18 will coincide with the index line 36 of the cursor 30. Any other stop means which have cooperating parts on the two cursors which will align the zero line 28 and the index line 36 when the two cursors are brought together will be considered within the scope of the invention.

A logarithmic scale 38 on the cursor 30 extends radially inward along the index line 36 and represents the fuel flow during any leg of a flight in hundreds of gallons per hour and should be termed the "fuel flow" scale and be so designated on the cursor 30. A runner 40 is slidable radially along the cursor 30 to more conveniently locate the graduation which represents the fuel flow during the leg of the flight under consideration. The operation of the device is best illustrated by an example.

*Example*

A plane having a gross weight of 105,000 lbs. carrying 5000 gallons of fuel is estimated to make the first leg of its flight in 45 minutes under flight conditions which will require a fuel flow of 400 gallons per hour. What will be the gross weight when the plane completes the first leg of the flight and how many gallons of fuel will remain?

Figure 2:
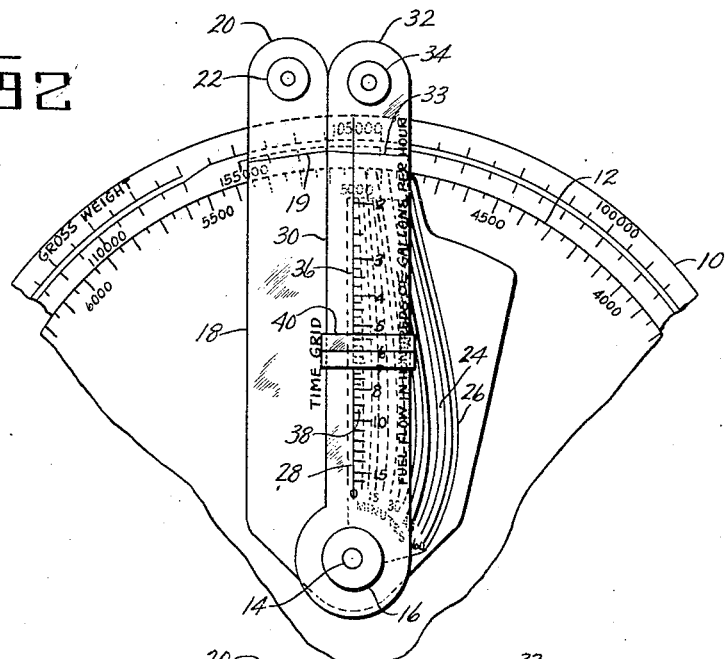
Figs. 2 and 3 show the several steps taken in setting the computer when solving a problem for which it is intended.
Figure 3:
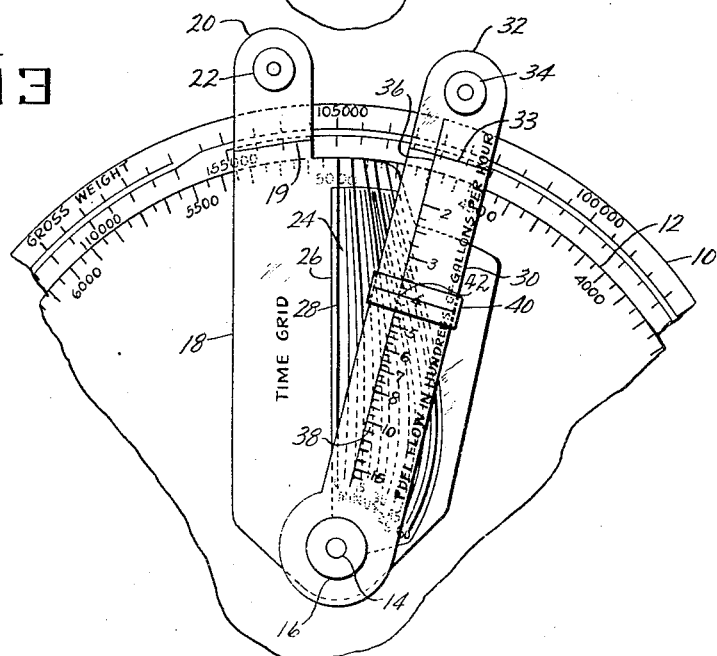

Bring the outer ends 20 and 32 of the cursors 18 and 30 together so that the zero line 28 and the index line 36 coincide; bring the aligned lines 28 and 36 to the gross weight (105,000 lbs.); lock the clamping means which consists of parts 21, 22 and 23; bring the gallons fuel (5000 gals.) to the index line 36; tighten the nut 16. The device will now appear as in Fig. 2. Now move the runner 40 radially to the fuel flow (400 gals. per hour); move the cursor 30 clockwise until the point 42 (the point where the hairline of the runner crosses the index line 36) is on the curved line 45; and read the new gross weight, 103,200 lbs., and the fuel remaining 4700 gals. on the index line 36 (see Fig. 3).

If the cursor 30 is now locked with the clamping nut 34, and the cursor 18 unlocked by loosening the clamping nut 22, the cursor 18 may be turned clockwise until arrested by the cursor 30, the cursor 18 then locked and the cursor 30 unlocked, whereupon the device is set up with the new "gross weight" and the new "gals fuel" on the index line 36 for calculating the next leg of the flight. Obviously, if so desired, the runner 40 may be omitted and the point of intersection of the logarithmic line representing the fuel flow in hundreds of gallons per hour with the index line 36 brought over that curved line of the "time grid" which represents the duration of the flight period. Moreover, if so desired, the "gals fuel" graduation may be reversed and the calculation made to show the gallons of fuel used instead of the gallons remaining.

Obviously, straight linear scales may be substituted for the "gross weight" and the "gals fuel" scale if the two cursors are arranged to slide therealong and the cursor indicia are suitably modified.

Having described an embodiment of my invention, I claim:

1. A cruise control computer which comprises an opaque lower disc, a "gross weight" scale circumferentially equally spaced along the outer edge of said lower disc, a concentric opaque upper disc of smaller diameter, a "gals fuel" scale circumferentially equally spaced along the outer edge of said upper disc, one unit on said "gals fuel" scale being equal in angular spacing to six units on said "gross weight" scale, means to lock said discs against relative rotation, a transparent cursor pivotally supported at the center of said discs, means to lock said cursor against rotation with respect to said lower disc, a zero line extending radially from a point near the center of said cursor to said "gals fuel" graduation, a "time grid" graduation comprising a series of curved lines adjacent the zero line extending inward from the "gals fuel" graduation to points near the center of said discs, said transparent cursor having an opaque portion upon which the zero line and the curved lines are placed, a second transparent cursor pivotally supported at the center of said discs superimposed on the first cursor, means to lock said second cursor against rotation with respect to said lower disc, an index line on the second cursor extending radially from a point near the center to the outer edge of the lower disc, contact portions carried on the cursors operative, when the cursors are brought alongside, to align the said zero line with the said index line, a logarithmic scale progressing radially inward along the said index line, and a transparent runner on said second cursor movable radially therealong and having a hairline alignable with the graduations of said logarithmic scale, the curved lines of the "time grid" being so plotted that the hundreds of gallons per hour set up on the "fuel flow" scale times the fraction of an hour set up on the "time grid" will equal the gallons of fuel on the "gals fuel" scale between the zero line of the first cursor and the index line of the second cursor.

2. A cruise control computer which comprises an opaque lower disc, a "gross weight" scale circumferentially equally spaced along the outer edge of said lower disc, a concentric opaque upper disc of smaller diameter, a "gals fuel" scale circumferentially equally spaced along the outer edge of said upper disc, one unit on said "gals fuel" scale being equal in angular spacing to six units on said "gross weight" scale, a transparent cursor pivotally supported at the center of said discs, a zero line extending radially from a point near the center of said cursor to said "gals fuel" graduation, a "time grid" graduation comprising a series of curved lines adjacent the zero line extending inward from the "gals fuel" graduation to points near the center of said discs, said transparent cursor having an opaque portion upon which the zero line and the curved lines are placed, a second transparent cursor pivotally supported at the center of said discs superimposed on the first cursor, an index line on the second cursor extending radially from a point near the center to the outer edge of the lower disc, abutting portions on the cursors operative, when the cursors are brought alongside, to align the said zero line with the said index line, a fuel flow scale progressing radially inward along the said index line, and a transparent runner on said second cursor movable radially therealong and having a hairline alignable with the graduations of said fuel flow scale, the curved lines of the "time grid" being so plotted that the hundreds of gallons per hour set up on the "fuel flow" scale times the fraction of an hour set up on the "time grid" will equal the gallons of fuel on the "gals fuel" scale between the zero line of the first cursor and the index line of the second cursor.

3. A cruise control computer which comprises a lower disc, a "gross weight" scale circumferentially equally spaced along the outer edge of said lower disc, a concentric upper disc of smaller diameter, a "gals fuel" scale circumferentially equally spaced along the outer edge of said upper disc, one unit on said "gals fuel" scale being equal in angular spacing to the average pounds per gallon of the fuel being used and shown on said "gross weight" scale, a cursor pivotally supported at the center of said discs, a zero line extending radially from a portion near the center of said cursor to said "gals fuel" graduation, a "time grid" graduation comprising a series of curved lines adjacent the zero line extending inward from the "gals fuel" graduation to points near the center of said discs, a second cursor pivotally supported at the center of said discs superimposed on the first cursor, an index line on the second cursor extending radially from a portion near the center to the outer edge of the lower disc, abutting surfaces on the cursors operative, when the surfaces are brought together, to align the said zero line with the said index line, a logarithmic scale progressing radially inward along the said index line, and a runner on said second cursor movable radially therealong and having a line alignable with the graduations of said logarithmic scale, the curved lines of the "time grid" being so plotted that the hundreds of gallons per hour set up on the "fuel flow" scale times the fraction of an hour set up on the "time grid" will equal the gallons of fuel on the "gals fuel" scale between the zero line of the first cursor and the index line of the second cursor.

4. A cruise control computer which comprises an equally spaced "gross weight" scale, a "gals fuel" scale equally spaced and movable along the edge of the "gross weight" scale, one unit on said "gals fuel" scale being equal in spacing to the average pounds per gallon of the fuel, the gross weight of which is indicated on said "gross weight" scale, a cursor movable along said scales, a zero line extending across said cursor to said "gals fuel" graduation, a "time grid" graduation comprising a series of lines adjacent the zero line, a second cursor superimposed on the first cursor, an index line on the second cursor extending transversely across said "gross weight" scale and said "gals fuel" scale, abutting surfaces on the surfaces operative, when the surfaces are brought together, to align the said zero line with the said index line, a fuel flow scale progressing along the said index line, and a runner on said second cursor movable along the index line and having a hairline alignable with the graduations of said fuel flow scale, the lines of the "time grid" being so plotted that the hundreds of gallons per hour set up on the "fuel flow" scale times the fraction of an hour set up on the "time grid" will equal the gallons of fuel on the "gals fuel" scale between the zero line of the first cursor and the index line of the second cursor.

ERVIN LESHNER.

REFERENCES CITED

The following references are of record in the file of this patent:

UNITED STATES PATENTS

| Number | Name | Date |
| --- | --- | --- |
| 1,444,381 | Landenberger | Feb. 6, 1923 |
| 1,918,188 | Luckey | July 11, 1933 |
| 2,190,281 | Berg | Feb. 13, 1940 |
| 2,268,886 | McNamara | Jan. 6, 1942 |